E. E. BERRY.
WHEEL.
APPLICATION FILED JULY 30, 1914.
1,161,285. Patented Nov. 23, 1915.
2 SHEETS—SHEET 1.
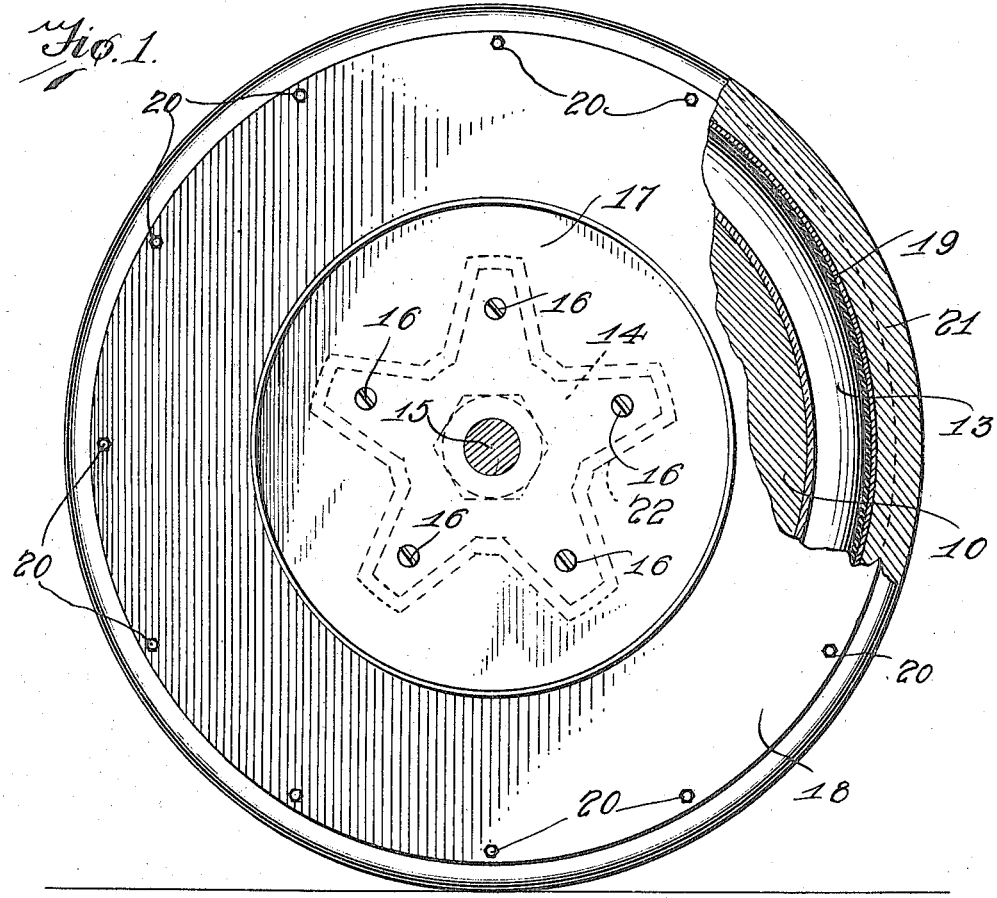
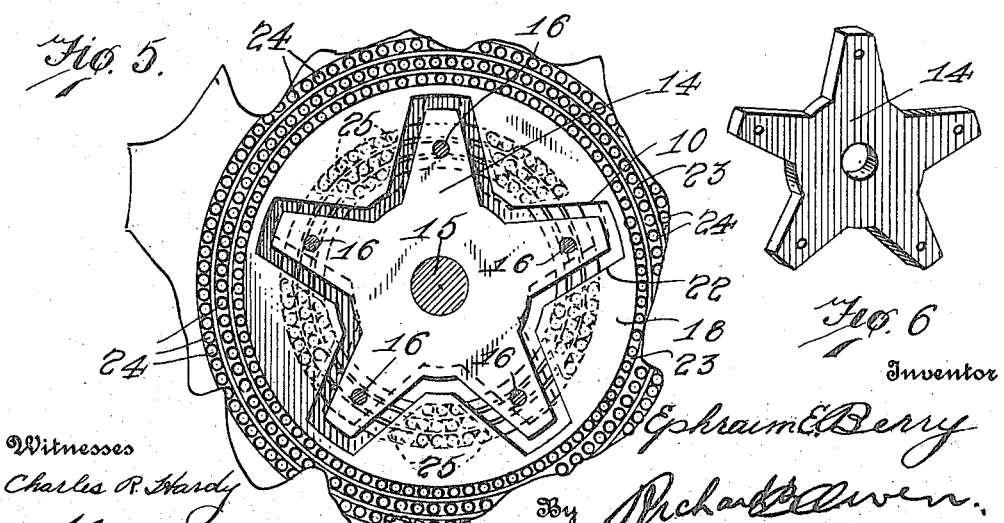

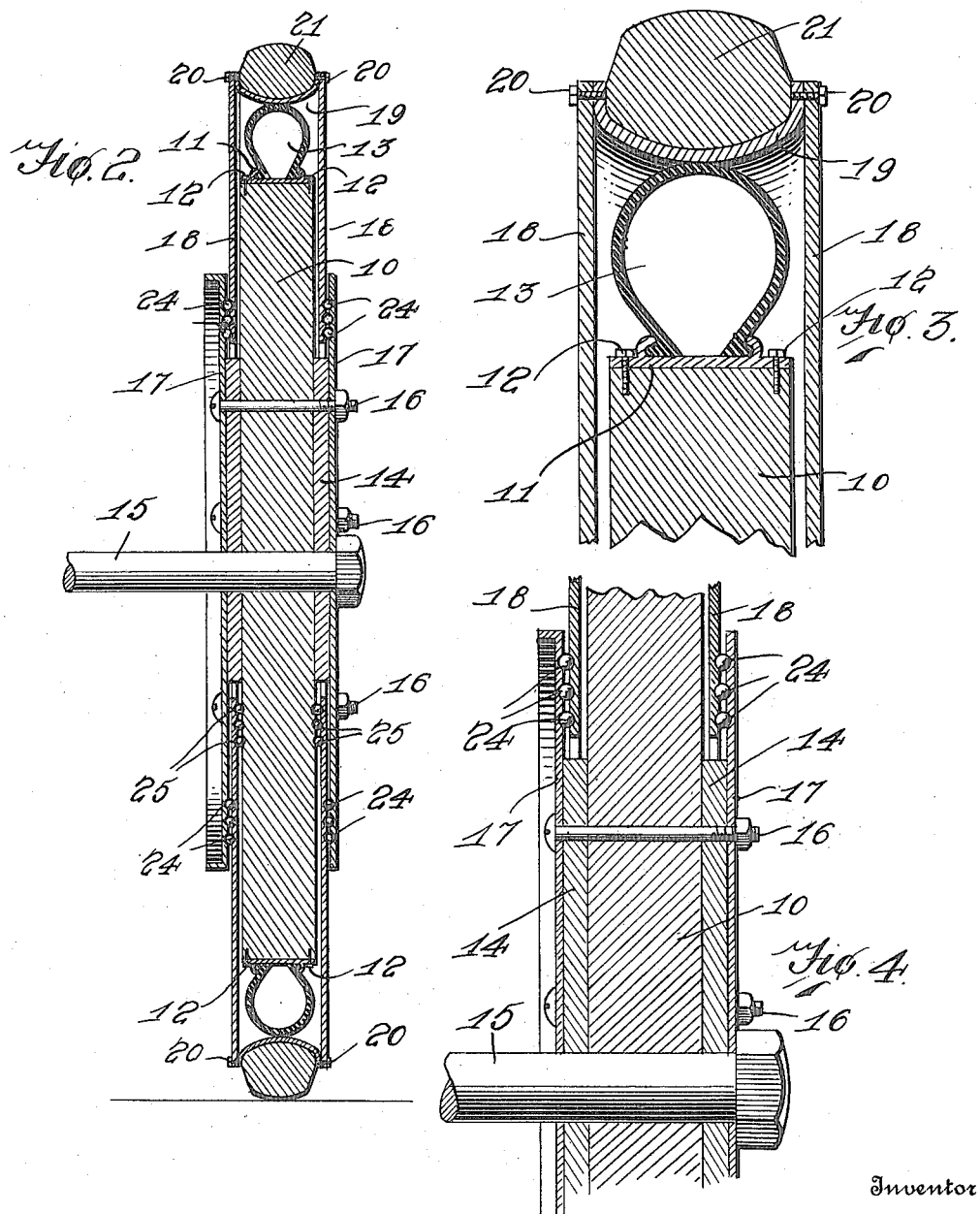

UNITED STATES PATENT OFFICE.

EPHRAIM E. BERRY, OF SEYMOUR, TEXAS.

WHEEL.

1,161,285.   Specification of Letters Patent.   Patented Nov. 23, 1915.

Application filed July 30, 1914. Serial No. 854,192.

*To all whom it may concern:*

Be it known that I, EPHRAIM E. BERRY, a citizen of the United States, residing at Seymour, in the county of Baylor and State of Texas, have invented certain new and useful Improvements in Wheels, of which the following is a specification.

This invention relates to an improved wheel construction and the principal object of the invention is to provide a wheel which will be puncture-proof and which will ride very easily.

Another object of the invention is to provide improved means for causing the tire protector casing to rotate with the inner wheel.

Another object of the invention is to so construct the protecting casing and inner wheel that the inner wheel may have a slight independent movement with respect to the casing when first starting, bearing balls being provided to permit the inner wheel to move easily when shifting its position with respect to the casing.

This invention is illustrated in the accompanying drawings, wherein—

Figure 1 is a view showing the wheel in side elevation, one portion of the wheel being broken away; Fig. 2 is a vertical sectional view through the improved wheel; Fig. 3 is an enlarged sectional view showing the upper portion of Fig. 2; Fig. 4 is an enlarged sectional view showing the central portion of Fig. 2; Fig. 5 is a fragmentary view of the central portion of the wheel, the view being shown principally in elevation and partially in section; Fig. 6 is a perspective view of one of the star-shaped plates which form part of this wheel.

The disk 10 which forms the body portion of this wheel carries a rim 11 which is secured to the disk by means of bolts 12 and carries the inflatable tire 13. The star-shaped plates 14 are placed upon the axle 15 upon opposite sides of the disk 10 and are secured to the disk by means of bolts 16 which also serve to hold the cover or bearing plates 17 and the star-shaped plates.

The protecting casing includes side plates or disks 18 which fit between the disks 10 and bearing plates 17 and have their outer edge portions connected with the cup-shaped rim 19 by means of bolts 20. This cup-shaped rim 19 carries a tire 21 of the solid type so that the machine will ride easily along the ground and not create a great deal of noise as would be the case if a metal tire were provided. The central portions of the side plates 18 of the protecting casing are provided with star-shaped cut outs 22, thus forming seats in which the star-shaped clutch plates 14 are positioned as shown in Fig. 5. From an inspection of this figure it will be readily seen that when the disk 10 turns with the axle 15, the arms of the clutch plates 14 will engage the plates 18 and thus cause the casing to rotate with the disk 10. In order to permit of free movement between the plates 18 and disk 10 and bearing plate 17 there have been provided annular grooves 23 in the disk and plates, thus providing bearing races in which the bearing balls 24 and 25 are placed.

When this wheel is in use, it is assembled as shown and described and the disk 10 can then rotate either forwardly or backwardly and carry the protecting casing with it. There will therefore be no independent movement between the tire 13 and rim 19 while the machine is moving excepting when first starting and therefore friction will be prevented and the tire 13 prevented from being worn through. If it is desired to make any necessary repairs, the protecting casing can be easily removed, the necessary repairs made and the wheel then reassembled.

What is claimed is:—

1. A wheel comprising a body portion, irregular plates secured to said body portion, bearing plates secured to said irregular plates, a tire, a casing inclosing said tire and including side plates extending between said body portion and bearing plates and provided with central openings conforming to the contour of said irregular plates, anti-friction members positioned between said side plates and said bearing plates and body portion, and a ground engaging tire carried by said casing.

2. A wheel comprising a body portion, clutch plates carried by said body portion, bearing plates fitting against said clutch plates, an inflatable tire for said body portion, a casing inclosing said tire and including side plates extending between said body portion and bearing plates, said clutch plates being adapted to engage the side plates of said casing to cause said casing to rotate with said body portion, and anti-friction means positioned between the side plates of said casing and said body portion and bearing plates.

3. A wheel comprising a body portion, clutch means carried by said body portion, a casing inclosing said body portion, said clutch means engaging said casing to cause the casing to rotate with said body portion, bearing plates fitting against said clutch means and extending along the outer faces of the side plates of said casing, and antifriction means positioned between the side plates of said casing and said body portion and bearing plates.

4. A wheel comprising a body portion, a clutch plate secured to each side of said body portion, the clutch plates being substantially star-shaped and provided with a relatively small number of engaging arms, the side faces of said body portion being provided with bearing races arranged in a circular course between the arms of said clutch plate, an inflatable tire carried by said body portion, a casing inclosing said tire and including a rim and side plates extending along the sides of said body portion and provided with openings conforming to the contour of said clutch plates, the side plates being provided with bearing races in their inner faces registering with the bearing races of said body portion and the bearing races in their outer faces positioned in circular tracks inclosing the openings through which said clutch plates extend, bearing plates secured to said clutch plates and extending in overlapping relation to the side plates of said casing and having their inner faces provided with bearing races registering with the bearing races in the outer faces of the side plates of said casing, bearing balls positioned in said races, and a ground engaging tire carried by the rim of said casing.

5. A wheel comprising a body portion, clutches carried by said body portion and provided with arms, a casing inclosing said body portion and including side plates having their central portions cut to conform to the contour of said clutches, and plates fitting against said clutches and extending along the outer faces of the side plates of said casing.

In testimony whereof I affix my signature in presence of two witnesses.

EPHRAIM E. BERRY.

Witnesses:
W. H. FRANCIS,
E. T. GASS.